US006969284B2

(12) United States Patent
Singer et al.

(10) Patent No.: US 6,969,284 B2
(45) Date of Patent: Nov. 29, 2005

(54) CONNECTOR ARRANGEMENT FOR COMPACT SERVOMOTOR

(75) Inventors: Helmut Singer, Bad Ditzenbach (DE); Tobias Schimmele-Brell, Weinstadt (DE); Gerhard Platzer, Winnenden (DE); Yasar Semerci, Heilbronn (DE); Andreas Wyderka, Korb (DE); Bernhard Rupp, Remseck (DE)

(73) Assignee: ITT Manufacturing Enterprise, Inc., Wilmington, DE (US)

( * ) Notice: Subject to any disclaimer, the term of this patent is extended or adjusted under 35 U.S.C. 154(b) by 0 days.

(21) Appl. No.: 10/894,791

(22) Filed: Jul. 20, 2004

(65) Prior Publication Data

US 2005/0020142 A1    Jan. 27, 2005

(30) Foreign Application Priority Data

Jul. 22, 2003    (DE) ................................ 103 34 655

(51) Int. Cl.⁷ ......................................... H01R 13/501
(52) U.S. Cl. ...................................... 439/701; 439/582
(58) Field of Search ................................ 439/701, 582, 439/350, 357, 587

(56) References Cited

U.S. PATENT DOCUMENTS 6,439,264 B1 *  8/2002  Ellis et al. ............... 137/596.2
6,497,035 B1 * 12/2002  Ratliff ......................... 29/596

FOREIGN PATENT DOCUMENTS

| DE | G 89 14 027.3   | 2/1990  |
| DE | 295 21 213 U1   | 2/1997  |
| DE | 101 19 178 A1   | 10/2002 |
| DE | 101 46 595 A1   | 2/2003  |

* cited by examiner

Primary Examiner—Gary Paumen
Assistant Examiner—Phuongchi Nguyen
(74) Attorney, Agent, or Firm—Peter Van Winkle

(57) ABSTRACT

A plug connector device (11, FIG. 2) for medium voltage (e.g. 220 volts) compact servomotors has a power plug unit (16) and a control signal plug unit (17), each with connectable/disconnectable outer and inner plugs (49,48 and 52,51), the units lying in a single connector housing that is supported around a wire-passing aperture (14) in a motor housing part (13) and that pivots to different angular positions.

6 Claims, 7 Drawing Sheets

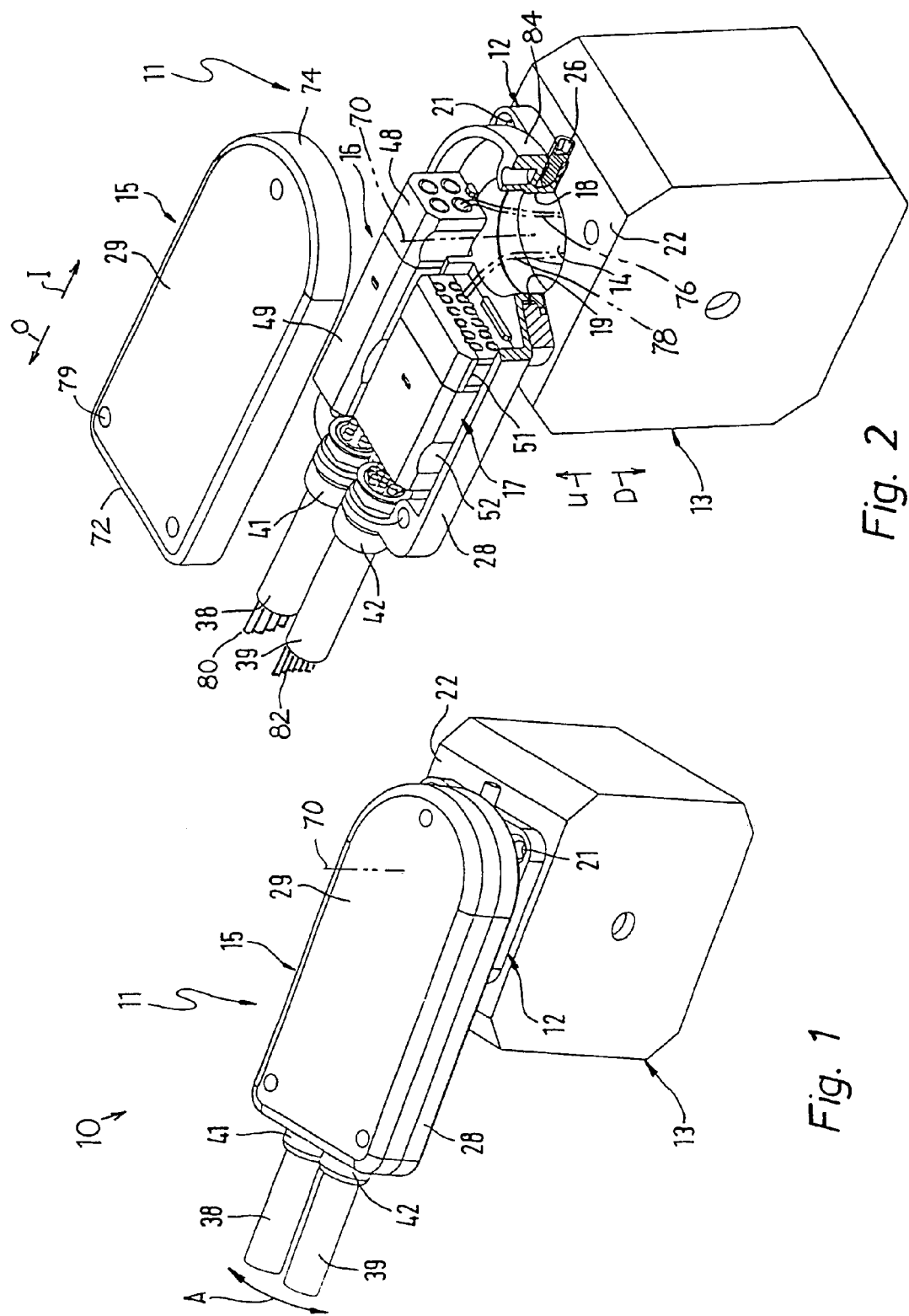

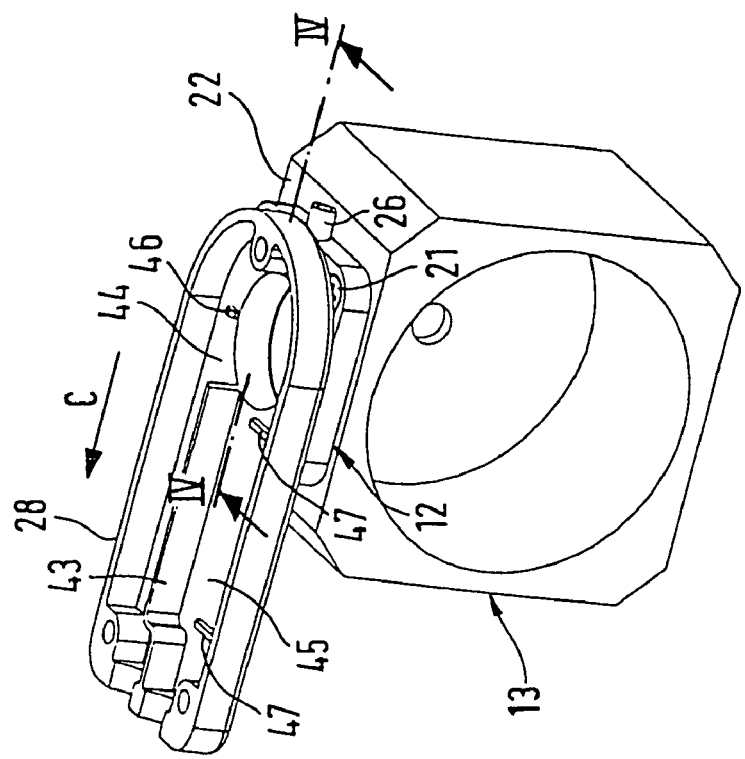
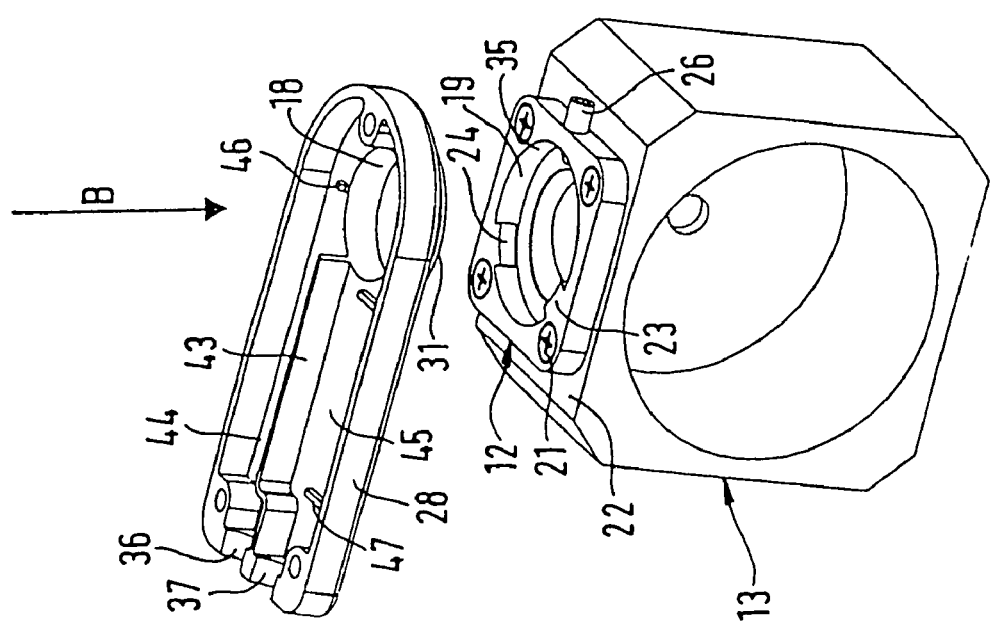
Fig. 3B
Fig. 3A

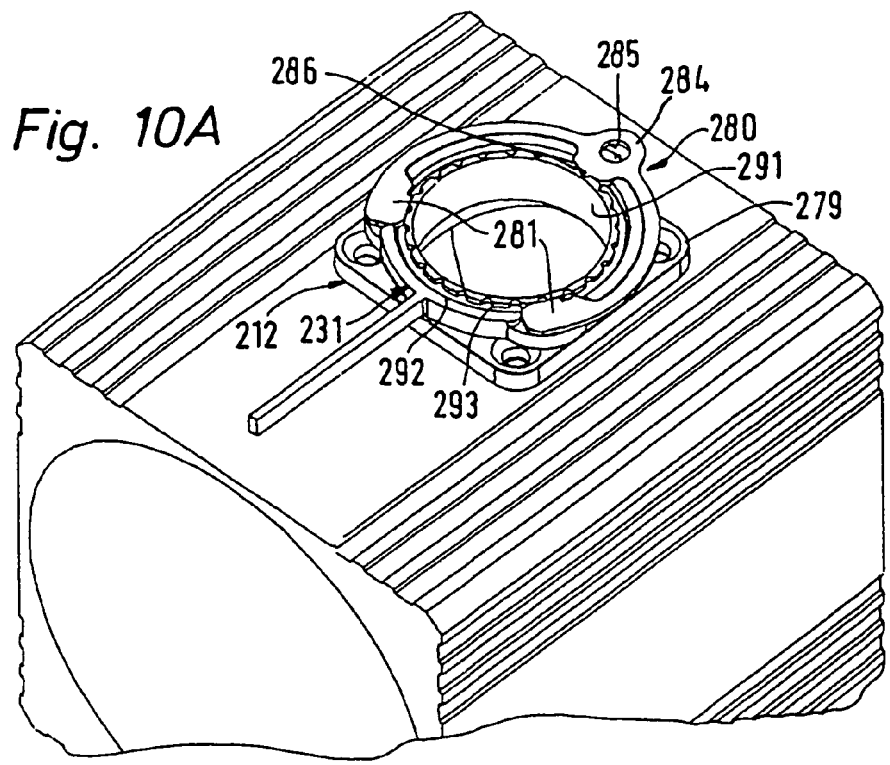
Fig. 10A
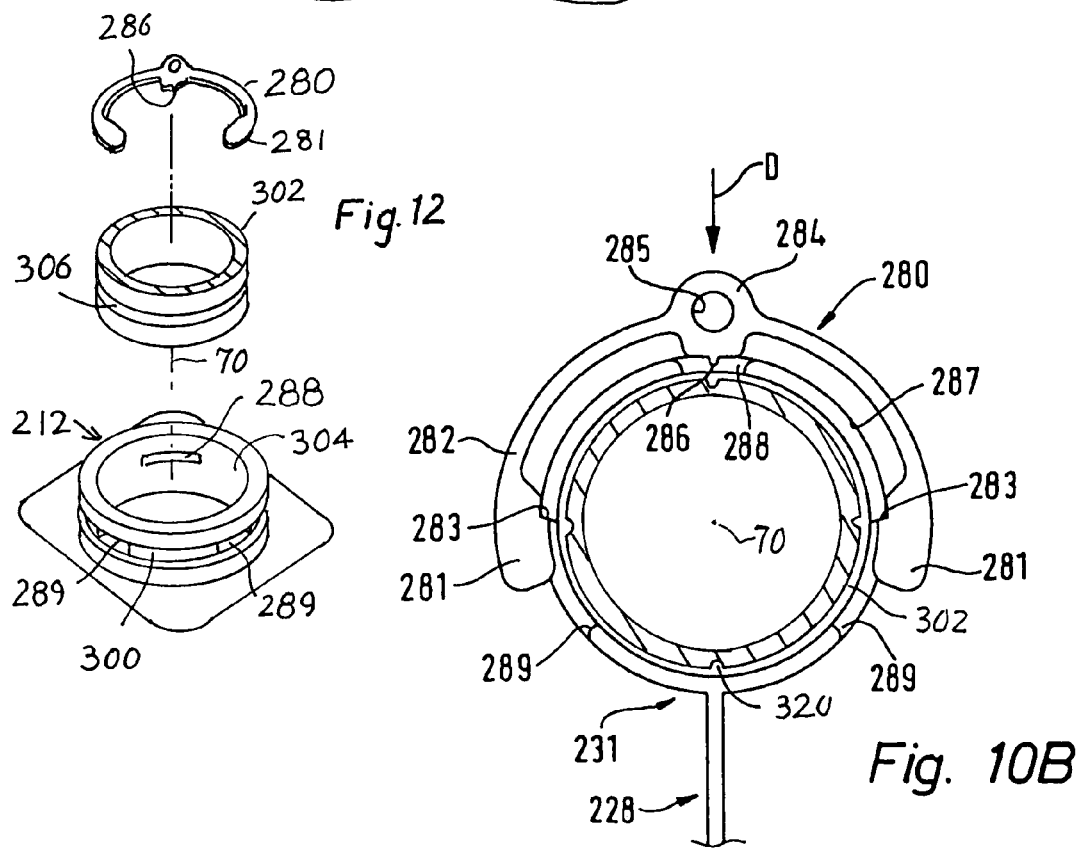
Fig. 12
Fig. 10B

CONNECTOR ARRANGEMENT FOR COMPACT SERVOMOTOR

BACKGROUND OF THE INVENTION

Current compact medium voltage (e.g. 220 volts) servomotors are connected to two separate pin-and-socket type connectors, one for power and the other for control signals. The two connectors which are separately mounted, occupy considerable space, especially compared to the compact servomotor itself. It has been suggested that the two connectors be arranged coaxially, but this would add considerable expense. A low cost and compact connector arrangement that connected power and control signal cable conductors to corresponding wires of a compact servomotor, using separate mateable plugs for isolation, would be of value. It also would be of value if the cables could extend in any of a plurality of directions from the motor.

SUMMARY OF THE INVENTION

In accordance with one embodiment of the invention, a compact and angularly adjustable servomotor system is provided that receives power and signal currents though wires extending though a wire-passing aperture in the motor housing, such currents passing though corresponding power and control signal cables and mateable connectors to the wires. The system includes a connector housing that has an inner end portion with an opening that is aligned with the wire aperture in the motor housing. The housing also has an outer end portion into which power and control signal cables extend. The shell holds mating pin-and-socket type inner and outer plugs of both a power plug unit and a control signal plug unit. The shell includes upper and lower metal shell parts that can be separated to install, remove, connect, and disconnect the plugs, and the shell halves then can be held together.

The shell is mounted on the motor housing so the shell can be pivoted to a selected position about the vertical axis of the wire-passing aperture in the motor housing, to allow the cables to extend in a desired horizontal direction from the shell. In one system, an adaptor is mounted on the motor housing and has an adaptor bore aligned with the wire-passing aperture. The lower shell half has a tubular portion that extends down into the adaptor bore. The tubular portion has a radially-outward flange at its lower end. A screw that extends though a threaded hole in the adaptor, has a screw end that moves over the flange to trap the shell in place on the adaptor and motor housing. The screw can be loosened slightly so the shell can be turned about the axis to extend in a desired direction, with the screw then tightened again to fix the direction.

In another system, screw holes are formed in the motor housing around the wire-passing aperture. The inner end of the lower shell has corresponding screw holes, so the shell can be fixed to the motor housing by screws. The screw holes are uniformly angularly spaced about the wire passing aperture, so the shell can be fastened at any one of a plurality of angular positions.

In another design, a clip ring is used to fasten a downwardly-extending tubular portion of the inner end of the lower housing shell to an adaptor mounted on the motor housing. The clip ring is installed in an adaptor groove. Radially inward projections of the clip ring pass through slots in the adaptor groove and enter portions of a groove in the tubular portion of the lower shell half. The clip ring has a projection that holds the shell in a selected angular position.

The novel features of the invention are set forth with particularity in the appended claims. The invention will be best understood from the following description when read in conjunction with the accompanying drawings.

BRIEF DESCRIPTION OF THE DRAWINGS

FIG. 1 is an isometric view of a system that includes a plug connector device of the invention that is attached to a servo motor housing.

FIG. 2 is a view similar to that of FIG. 1 but with the shell cover lifted off and an inner part of the plug connector device cut away.

FIG. 3A is an exploded isometric view of a portion of the plug connector device of FIG. 1, showing a step in mounting the lower shell part onto an adaptor on the motor housing.

FIG. 3B is an isometric view similar to that of FIG. 3A but with the lower shell part mounted on the adaptor on the motor housing.

FIG. 10A is an isometric view of the system of FIG. 9, as cut away along line X—X of FIG. 9.

FIG. 10B is a plan view of a portion of the system of FIG. 10A, with the clamping ring shown in its prelatching position.

FIG. 12 is an exploded isometric view showing parts of the system of FIG. 8.

DESCRIPTION OF THE PREFERRED EMBODIMENTS

Limited Description

Figure 4:
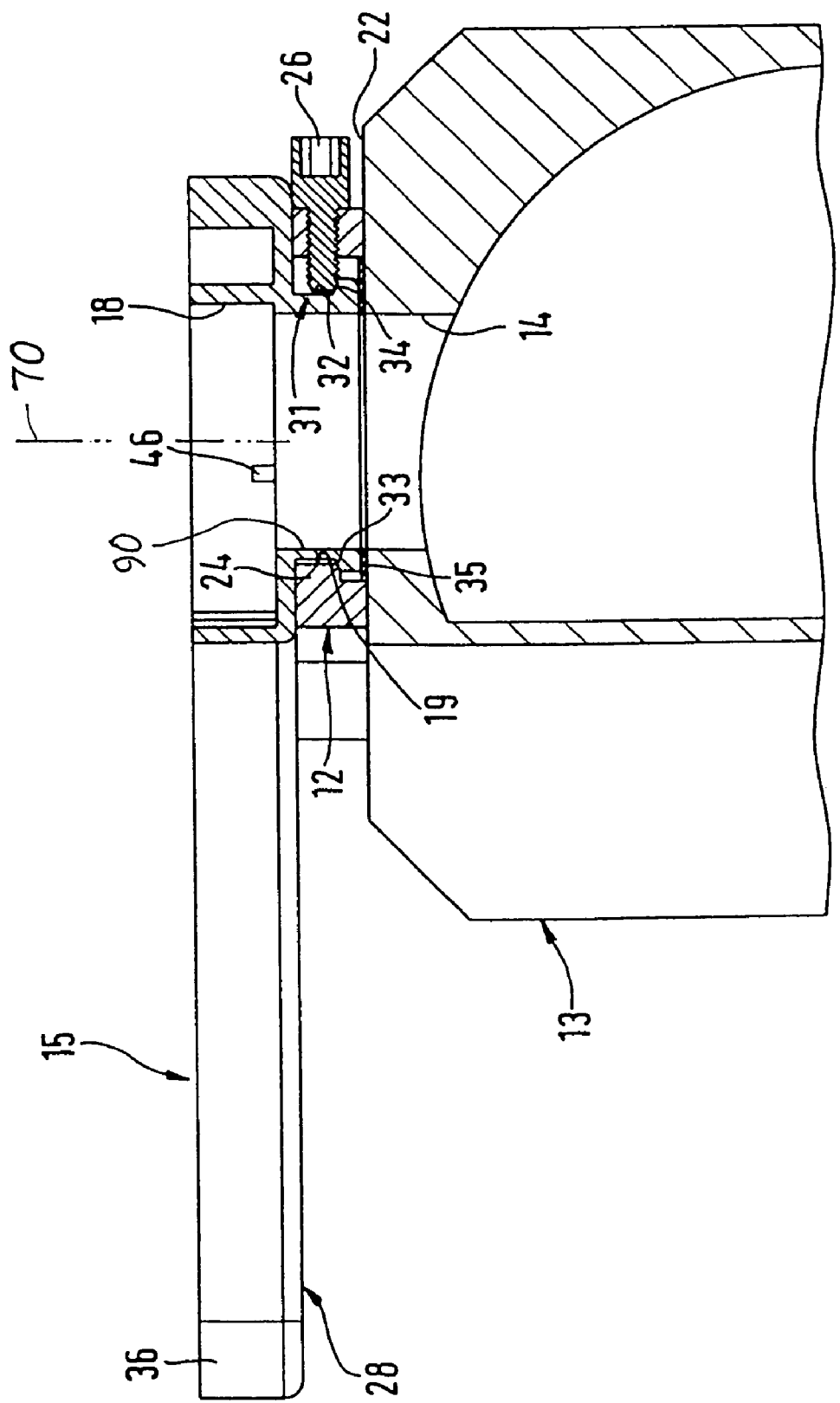
FIG. 4 is a partially sectional view taken on line IV—IV of FIG. 3B.

FIG. 1 shows a servo motor system 10 of the present invention, which includes a compact servo motor with a motor housing 13, and a plug connector device 11 attached to the motor housing. The plug connector device 11 guides a power cable 38 and a control signal cable 39 so they extend to, and so they releasable connect to, corresponding wires of the motor. The plug connector device can be pivoted about a vertical axis 70 on the motor housing to guide the cables so they extend in any one of a group of compass directions (directions angled about the axis). Such pivoting about axis 70 is indicate by arrows A.

FIG. 2 shows that the plug connector device includes a metal connector housing 15 having a lower housing part or shell 28 and an upper housing part, or shell, or cover 29. The connector housing has a small vertical thickness, a larger width, and a still larger length in the direction of arrows I, O. The housing has an outer end 72 from which the cables extend, and has an inner end 74 that connects to the motor housing 13. The motor housing has a bushing or aperture 14. Power and control signal wires indicated at 76 and 78 extend though the aperture. Inward and outward directions are indicated by arrows I and O, while upward and downward directions are indicated by arrows U and D. The system can be used in any orientation, and the arrows and descriptions of "up", "down", etc. are made only to help describe the system.

Figure 5A:
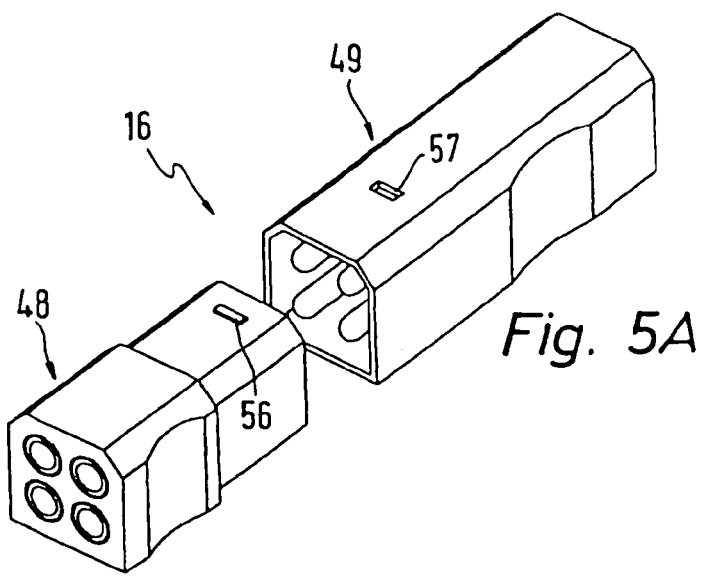
FIG. 5A is an exploded isometric view of the inner and outer power plugs of the plug connector device of FIG. 2.
Figure 5B:
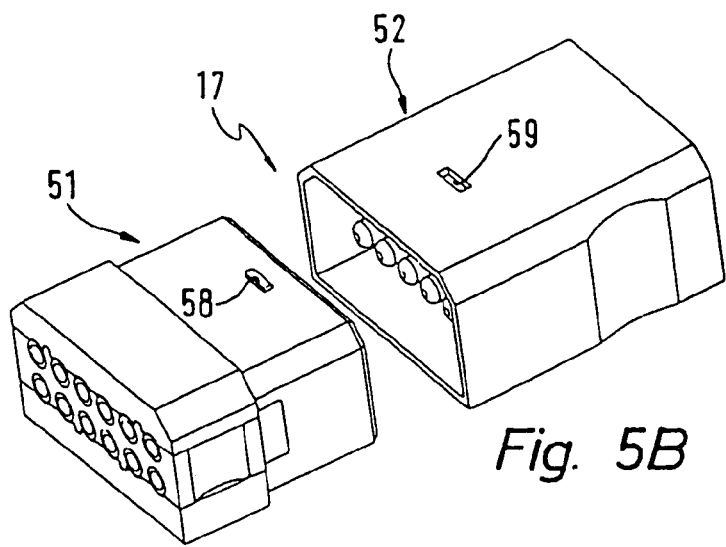
FIG. 5B is an exploded isometric view of the inner and outer control signal plugs of the plug connector device of FIG. 2.

A power plug unit 16 and a control signal plug unit 17 lie in the connector housing 15. The power plug unit 16 includes inner and outer power plugs 48, 49 that connect by engagement of pin and socket contacts of the plugs. Similarly, the control signal plug unit 17 includes inner and outer control signal plugs 51, 52 with pin and socket contacts. FIGS. 5A and 5B show the pins of the outer plug connectors. FIG. 2 shows that the cables have power and control signal conductors 80, 82 that connect to contacts of the outer plugs 49, 52. The power and signal wires 76, 78 connect to contacts of the inner plugs 48,51. The inner and outer plugs of each unit are preferably mated before the units are installed in the lower shell 28 and the shells are connected together. The shells are shown connected together by screws that pass though three holes 79.

The motor housing 13 shown in FIG. 2 forms the aperture 14 though which the power and control signal wires extend. The axis 70 lies on the axis of the aperture. The lower shell has an inner end or end portion 84 that must be mounted on the motor housing 13. The lower shell has an opening 18 at its inner end that must lie aligned with the motor housing aperture. As mentioned above, it is highly desirable that the connector housing 15 be capable of pivoting about the axis 70 to different angular positions.

As shown in FIG. 3A, applicant provides an adaptor 12 which is mounted on the motor housing 13. The motor housing is formed with four threaded holes that receive four screws 21 that pass though adaptor holes. The adaptor has a bore 19 that is aligned with the motor housing aperture. As shown in FIG. 4, the lower shell has a tubular part 90 and has a radially outwardly-extending (with respect to axis 70) flange 35 whose upper surface forms an upwardly-facing shoulder. FIG. 3A shows that the adaptor has a pair of projections 23, 24 at one side of its bore and has a screw 26 at its opposite side. With the screw loose, the lower shell tubular part can be moved down into the adaptor bore 19. Then, as shown in FIG. 4, the screw 26 is tightened to fix the connector housing 15 in place. The screw can be loosened slightly to allow the connector housing to be turned to extend at a different angle, and the screw then can be tightened to fix that angle. The general arrangement of two projections and a screw is known for holding parts together, but has not been used to hold a plug connector device to an adaptor on an apparatus such as a motor.

Figure 11:
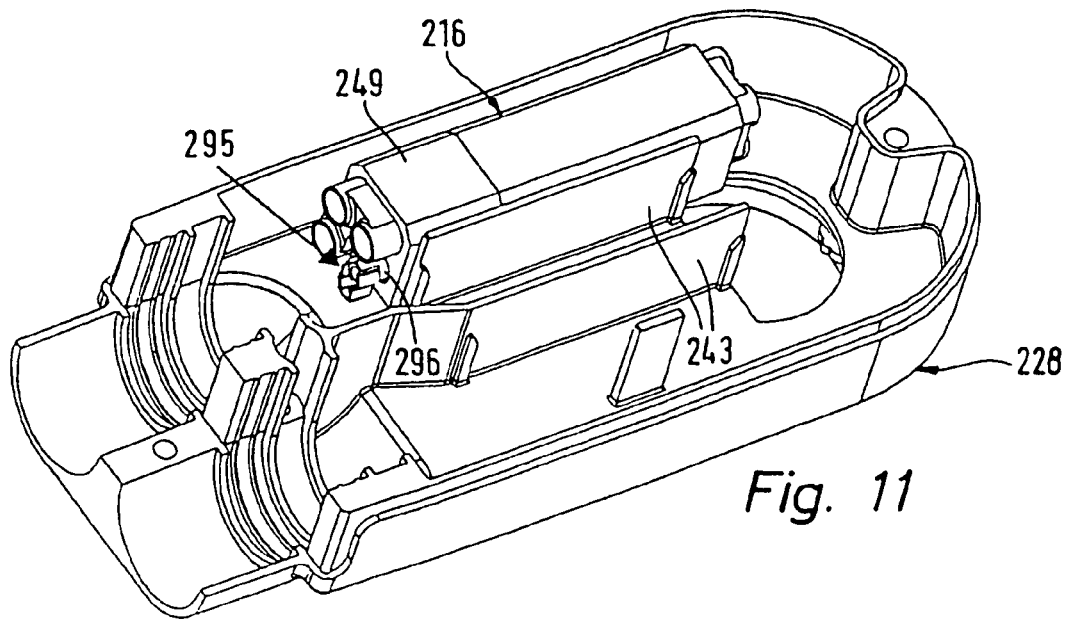
FIG. 11 is an isometric view of the lower shell part of the system of FIGS. 1 and 7.

FIG. 11 shows that a metal shield 243 is placed between the power and plug units lying in the connector housing.

Figure 7:
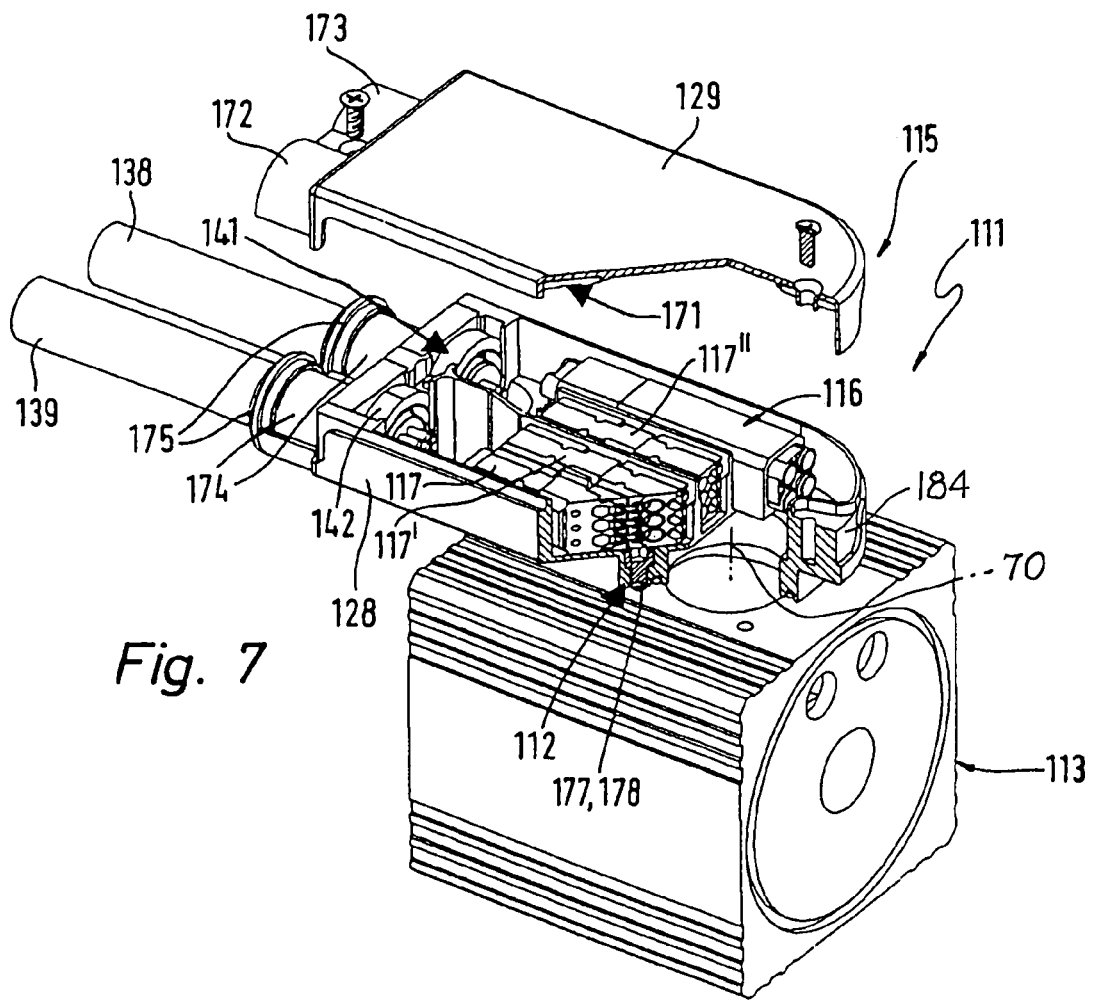
FIG. 7 is an isometric view of a system that includes a plug connector device of a second embodiment of the invention that does not include an adaptor, with the cover lifted off and with an inner part of the plug connector device cut away.

FIG. 7 shows another embodiment of the invention wherein the lower shell 128 has an inner end 184 that is mounted on the motor housing 113 without an adaptor. The motor housing is formed with threaded holes 177, and screws 178 that pass through holes in lower walls of the lower shell. The screws are threadably engaged with the threaded holes 177 of the motor housing. The holes in the motor housing and the screw-receiving holes in the lower shell are uniformly spaced about the axis 70 of the wire-passing aperture in the motor housing. This allows the plug connector housing 115 to be installed in any one of a plurality of angular orientations about the axis 70. The particular system shown has four holes in the motor housing and four holes in the inner end of the lower shell, which allows rotating to four positions spaced 90° apart about the axis 70.

Figure 8:
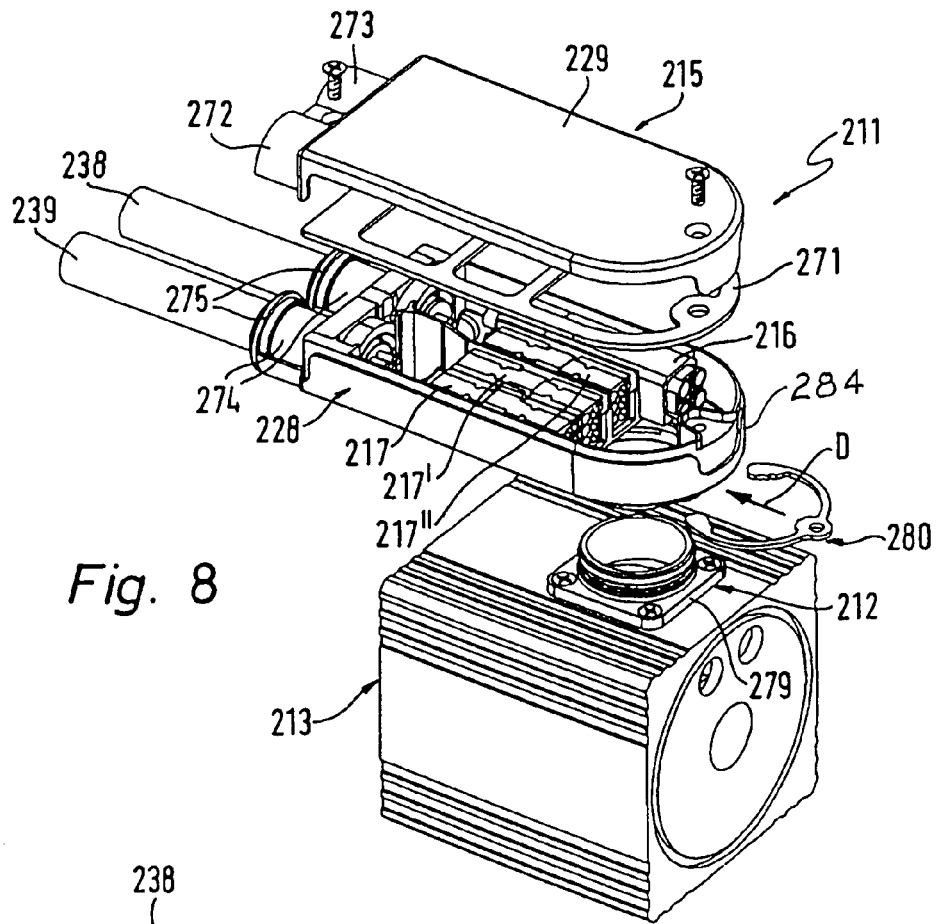
FIG. 8 is an exploded isometric view of a system of a third embodiment of the invention that uses a clip to hold and position a connector housing on an adaptor that is mounted on a motor housing.

FIG. 8 illustrates another system wherein an adaptor 212 is mounted by screws onto the motor housing 213, and the lower shell inner end 284 is mounted on the adaptor by a clamping ring or clip 280. The clip is preferably formed of stainless steel. As shown in FIG. 10B, the clip has a pair of widened ends 281 that can be resiliently spread apart. The clip also has a middle or eye 284 with a hole and with at least one latching tooth 286.

As shown in FIG. 12, the clip is first installed in a radially outer groove 300 in the adaptor 212. The lower shell inner end has a downwardly-extending tubular part 302 that fits into a bore 304 in the adaptor. The tubular part has an inner groove 306. The adaptor groove has three slots 289, 289, 288 and the clip widened ends 281 and tooth 286 each projects through one of the slots into the inner groove 306. In this way, the clip prevents the lower shell inner end tubular part from pulling up, so long as the clip is fully installed.

The inner groove 306, which lies on the tubular part that extends from the lower shell, has a plurality of indentations, shown at 320 in FIG. 10B. When the clip is fully installed, the latching tooth 286 lies in one of the indentations and resists pivoting of the plug connector housing about the axis 70. However, the plug connector housing can be forced to rotate, and the clip serves as a spring-biased latch that holds the plug connector housing in the position to which it is pivoted.

DETAILED DESCRIPTION

In accordance with FIG. 1, in a first exemplary embodiment, a plug connector device 11 is attached via an adapter 12 to a housing part 13 of an undepicted compact servomotor so as to be rotatable in the direction of double arrow A and as well as detachable. Plug connector device 11, as can be seen in FIG. 2, has a first plug connector unit 16 for the operating voltage of the servomotor and a second plug connector unit 17 for the control signals of the servomotor, both units being accommodated in a single, joint connector housing 15. Both motor housing part 13 as well as joint connector housing 15 have a bushing 14, 18 for the electrical leads to the servomotor, a through bore hole 19 of adapter 12 being arranged between bushings 14 and 18, preferably in rough alignment with them.

Adapter 12 has the shape of a roughly square, flat disk that is furnished with through bore hole 19, the disk in the exemplary embodiment depicted being attached by four screws 21 to an exterior surface 22 of motor housing part 13. It is obvious that adapter 12 can also be molded on motor housing part 13. Adapter 12, which occupies a significant portion of relevant exterior surface 22 of motor housing part 13, is provided on the interior circumference of through bore hole 19 with two radial projections 23 and 24, whose radial interior surfaces are also circular. Two radial projections 23 and 24 are spaced at an acute angle with respect to the radius of the bore hole; in addition, they are relatively narrow. Their width is less than the axial dimensions of the interior circumference of through bore hole 19 and of the width of adapter 12, their surfaces aligning with the surface of the adapter. A fixing screw 26 in the form of a setscrew is radially introduced so as to be able to be screwed in and out from outside and is situated roughly diametrically opposite two adjoining radial projections 23 and 24, i.e., from their midpoint.

Connector housing 15 is in two parts, i.e., it is composed of a lower shell 28 and a cover shell 29, cover shell 29 being able to be detachably screwed onto lower shell 28. Facing away from cover shell 29, lower shell 28 around its bushing 18 has an annular projection 31, which is provided with an annular undercut 32 (FIG. 4). The exterior diameter of annular projection 31 is the same as or smaller than the remaining interior diameter between radial projections 23 and 24, on the one hand, and the interior circumferential area on unscrewed fixing screw 26 of adapter 12, on the other hand. In this way, in accordance with FIG. 3B, annular projection 31 of lower shell 28 of connector housing 15 can be inserted into adapter 12 in the direction of arrow B. If, after this insertion, as depicted in FIG. 3B, fixing screw 26 is screwed into undercut 32 so as to engage, annular projection 31 and therefore lower shell 28 is displaced in the direction of arrow C toward two; radial projections 23 and 24, which contact annular undercut 32 on annular projection 31. In this way, lower shell 28 is held at three locations within annular undercut 32 of annular projection 31, namely at both radial projections 23 and 24, on the one hand, and at fixing screw 26, situated roughly diametrically opposite, on the other hand. Annular undercut 32 on annular projection 31, like both radial projections 23 and 24 and like the tip of fixing screw 26, is provided with a beveled surface 33, 34, by which annular projection 31 is pressed toward exterior surface 22 of motor housing part 13, which is covered with a sealing ring 35; in this manner, a tightly sealed connection of housing lower shell 28 on motor housing part 13 is assured via its annular projection 31. When fixing screw 26 is loosened, it is possible without damaging the seal to rotate lower shell 28 and therefore entire connector housing 15 with respect to motor housing part 13 in the direction of the aforementioned double arrow A due to the aforementioned three-point connection that engages from different sides radially.

Lower shell 28 of connector housing 15 has an elongated shape that is rounded in front and rectangular in the rear, as can be seen in FIGS. 1 through 3. Annular projection 31 is arranged in the area of the rounded shape in front, whereas in the area of the rectangular edge in the rear, two semicircular cutouts 36 and 37 are formed next to each other, into which cable clamps 41, 42 are inserted for the feeding through of two adjacent cables 38 and 39.

Lower shell 28 of connector housing 15, which is molded out of plastic and/or metal, is provided with a shielding separating wall 43 in the longitudinal direction and, on both sides of this shielding separating wall 43 in two receiving spaces 44 and 45 thus remaining, with front and rear fixing projections 46 and 47. Into these receiving spaces 44 and 45, first plug connector unit 16 and second plug connector unit 17 are inserted and supported (FIG. 2) in a joined state that is constituted by one socket plug 48, 51 and one pin plug 49, 52. It is obvious that, although it is not depicted, the likewise undepicted wires of both cables 38 and 39 are joined to the pin plugs 49, 52 in question, whereas the other ends of first and second plug connector units 16, 17, depicted here as socket plugs 48, 51, are joined to likewise undepicted electrical leads for the operating voltage and the control signals to the servomotor.

First and second plug connector units 16 and 17 are mounted within the connector housing 15 in the following manner. If the undepicted wires leading from the servomotor are pulled out through bushing 14 in motor housing part 13, they can be joined to socket plug 48 of first plug connector unit 16 and to socket plug 51 of second plug connector unit 17. It is obvious that in this state, adapter 12 is already mounted and the wires are led out through adapter 12. It is then possible to fixedly connect these wires to socket plug 48, 51. Thereafter, socket plugs 48 and 51, in sequence, are pushed through sufficiently large bushing 18 of connector housing 15, i.e., from its lower shell 28. After pin plugs 49, 52 are connected to the wires of relevant cables 38, 39, the former are connected to respective socket plugs. 48, 51 and are introduced into the above-mentioned receptacle spaces 44, 45. In this assembly step or in a preceding one, lower shell 28 can be joined to adapter 12 in the manner depicted above. Thereafter, according to FIG. 2, cover shell 29 is placed onto lower shell 28 and is screwed down at, for example, three points. In this context, clamps 41 and 42, i.e., cables 38 and 39, are supported in clamping fashion between lower shell 28 and cover shell 29 of connector housing 15. It is clear that socket plugs 48 and/or 51 and pin plugs 49 and/or 52 can be exchanged.

In the exemplary embodiment depicted in FIGS. 1 through 6, undepicted latching means can be provided on connector housing 15, for example, on annular projection 31 and on adapter 12, in order to achieve preferential positions of, for example, 15°-, 30°-, 45°-steps or the like, when connector housing 15 is rotated with respect to motor housing part 13 in accordance with double arrow A.

According to FIGS. 5A and 5B, socket and pin plugs 48, 51 and 49, 52, are provided with a latching catch and a latching recess 56, 57, and 58, 59. In addition, in the joined state, a planar exterior contour results of two plugs 48 and 51, 59 and 52, which are joined to form first plug connector unit 16 and second plug connector unit 17, respectively. To separate the plugs, it is possible to undo the latching connection 56 through 59 by applying tensile force.

Figure 6:
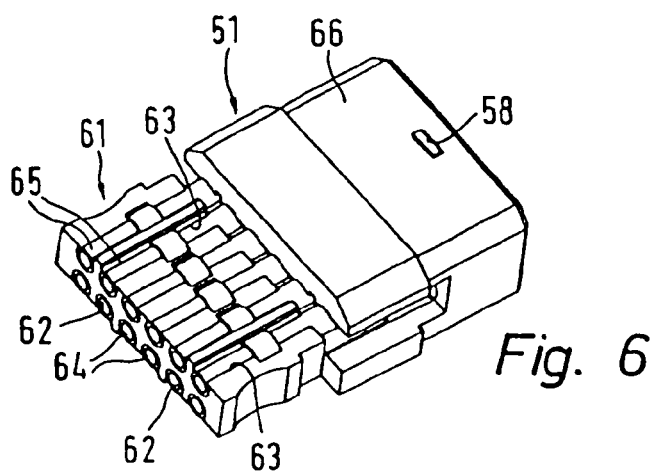
FIG. 6 is a partially sectional isometric view of the inner control signal plug of FIG. 5B.

FIG. 6 shows a socket plug 51 for the control signal wires, socket plug 51 being configured in two parts with respect to its insulation housing. An interior part 61 is provided with an upper and a lower row of axial, undercut channels 62, 63, which are open towards the upper and lower sides over a width of less than the channel diameter. Into these undercut channels 62 and 63 it is possible to insert socket contacts 64 and 65 from above and from below. In this context, the axially central undercut assures that socket contacts 64, 65 are axially unmovable. This interior part 61 that is equipped with the socket contacts can then be inserted into a hollow insulating body 66 and held, for example, in a clamping or latching fashion. It is clear that not only socket plug 51 for the control signal contacts but also socket plug 48 for the operating voltage contacts can be configured in this manner. In addition, pin contacts 49, 52 can also be manufactured in this way.

In the second exemplary embodiment, depicted in FIG. 7, of a plug connector device 111, which is attached to a motor housing part 113 via an adapter 112, connector housing 115 is externally configured similar to connector housing 15 in accordance with the first exemplary embodiment, i.e., it is composed of a lower shell 128 and a cover shell 29.

In this connector housing 115, lower sh-ell 128 provides space for a total of four plug connector units 116, 117, 117' and 117", which are joined to two cables 138 and 139 at the input side. Whereas in the first exemplary embodiment in addition to plug connector unit 16 (here 116) for the voltage supply only one plug connector unit 17 was provided for the signal lead, in this second exemplary embodiment three plug connector units 117, 117', 117" are provided for the signal lead. Cover shell 129 is provided with a seal 171. In addition, cable clamps 141 and 142 are moved within lower shell 128, whereas on the exterior side guideway half shells 172 and 173 are provided, which support cables 138, 139 using crimping sleeves 174 and rubber seals 175.

A further difference between this second exemplary embodiment (FIG. 7) and the first exemplary embodiment (FIG. 2) lies in the fact that adapter 112 is molded on lower shell 128 of plug connector unit 111 and is provided with a total of four bore holes 177 for attaching adapter 112 and lower shell 128 to motor housing part 113 in its threaded bore hole 178. Bore holes 177 in molded adapter 112 are accessible from the base of lower shell 128. In other words, connector housing 115, in the open state and before the insertion of plug connector units 116, 117, 117' and 117", can be fixedly screwed on motor housing part 113. Because in this variant four through bore holes 177 are provided in adapter 112 and four threaded bore holes 178 are provided in motor housing part 113, in each case an identical distance from each other, connector housing 115 is fixedly screwed in such a manner that, although it is non-rotatable, nevertheless the position of connector housing 115 can be selected in positions 0°, 90°, 180°, 270°, and 360° with respect to motor housing part 113.

Plug connector units 116, 117, 117', 117" are selected in accordance with the representations in FIGS. 5A, 5B, and 6, with the difference that the plug connector units for the signal leads do not have 12 poles but rather in the exemplary embodiment only have six poles, but for that reason are provided in threes.

Figure 9:
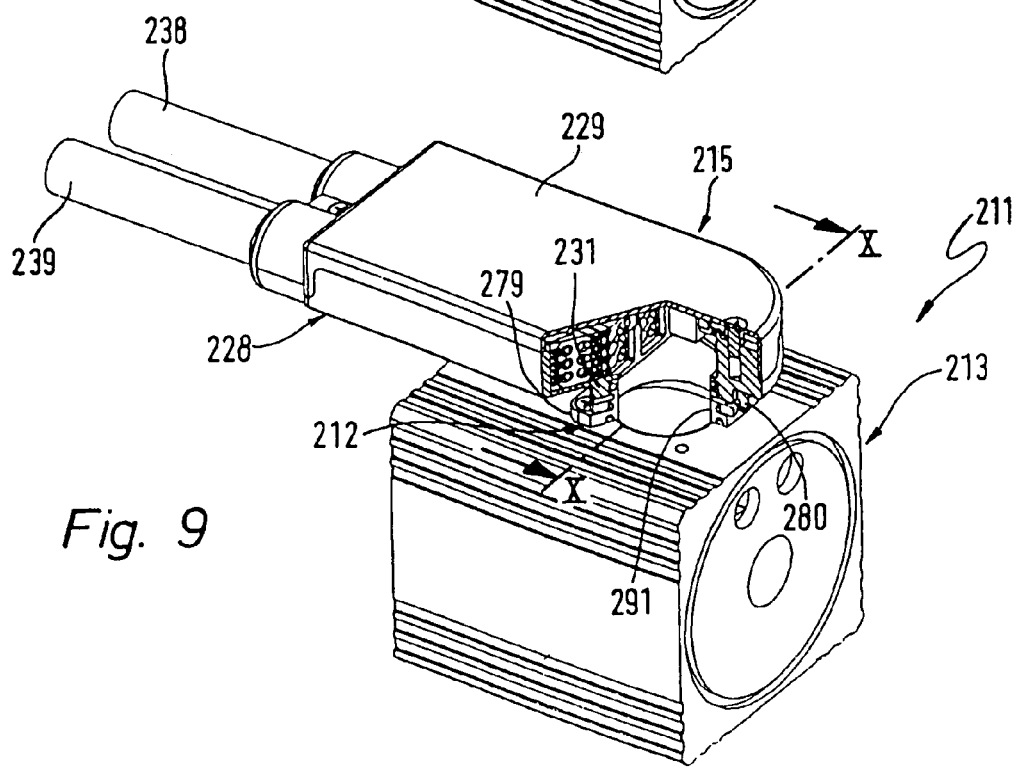
FIG. 9 is an isometric view of the system of FIG. 8, with an inner part of the plug connector device cut away.

In the FIGS. 8 to 10, a plug connector unit 211 according to a third exemplary embodiment is depicted. In this exemplary embodiment, the interior space of connector housing 215 is configured in accordance with connector housing 115 and consequently is furnished with a total of four plug connector units 216, 217, 217', 217". The further interior configuration of connector housing 215 corresponds to that of connector housing 115, such as seal 271, guideway half shells 272, 273, crimping sleeves 274, 275, rubber seals 275, etc.

In this third exemplary embodiment of the present invention, connector housing 215, similar to connector housing 15 of the first exemplary embodiment, is rotatably supported on the motor housing part 213 so as to be able to be latched in variously stepped angular positions. For this purpose, a baseplate 279 of an adapter 212 is fixedly screwed on motor housing part 213 using four screws. In addition, the lower side of lower shell 228 of connector housing 215 is provided with an annular projection 231, whose exterior diameter is smaller than the interior diameter of adapter 212 and therefore can be inserted into the adapter.

To achieve the axial, fixed, and rotatable connection of annular projection 231 of connector housing 216 on adapter 212 that is attached to motor housing part 213, a clamping ring 280 like a Seeger circlip ring is provided (FIGS. 10A and 10B). Clamping ring 280 is open on one side and has on both of its free ends a radially inwardly projecting widened area 281, whose interior surface on the transition to the annular area 282 of clamping ring 280 is provided with a spring-action step 283. The center of clamping ring 280 is configured as an eye 284 having a bore hole 285, eye 284 having a latch, or latching tooth 286, that is oriented radially towards the interior. For receiving clamping ring 280, annular projection 231, which axially projects from lower shell 228, has an exterior annular groove 287, which on three circumferential areas is provided with a central cutout 288 and two end-side cutouts 289 from the base of annular groove 287 extending towards the interior. Central cutout 288 functions to permit the penetration of an interior area of eye 284, that is provided with latching tooth 286, whereas two end-side cutouts 289 function to permit the penetration of the widened area 281 that is provided with step 283.

Inserting clamping ring 280 into annular groove 287 is accomplished from the position depicted in FIG. 8 in the direction of arrow D, the interior edge of widened area 281 initially sliding by on the base of the areas of annular groove 287 in question and initially pre-latching in end-side cutout 289 (FIG. 10B). In this pre-latching position widened areas 281 in end-side cutouts 289 are found in a pre-latched condition, such that steps 283, due to the radial biasing of the annular clamping ring areas, latch behind the interior edge of end-side cutout 289. In this pre-latching position, both latching tooth 286 as well as the interior areas of widened areas 281 are radially set back from the interior circumference of annular projection 231 of lower shell 228. Therefore, in this pre-latching position, clamping ring 280 cannot engage in adapter 212 so that lower shell 228 can be axially inserted over adapter 212 and can be covered in the circumferential direction with respect to the adapter.

Adapter 212, whose cylindrical part 291, projecting from baseplate 279, engages in annular projection 231, has an annular groove 292, whose base is provided with a toothing 293. If the end face of annular projection 231 rests on baseplate 279, which is screwed fixedly to motor housing part 213, then annular groove 292 that is provided with toothing 293 is located at the axial height of and is radially aligned with annular groove 287 of annular projection 231, and with its cutout 288 and 289. If clamping ring 280 from its pre-latching position (FIG. 10B) is further displaced in the direction of arrow D, then both widened areas 281 arrive at toothing 293 in annular groove 292, i.e., move out of the latching connection in the end-side cutout 289 of annular projection 231. At the same time, latching tooth 286 of eye 284 arrives in toothing 293 of cylindrical part 291, so that connector housing 215 is fixedly secured on adapter 212 so as to be nonrotatable (FIG. 10A).

It is then possible once again to rotate connector housing 215 with respect to adapter 212, i.e., motor housing part 213, if clamping ring 280 is pulled back opposite the direction of arrow D into its pre-latching position as depicted in FIG. 10B, or preferably if by rotating connector housing 215 using a great expenditure of force, clamping ring 280 pulls back independently. In accordance with the selected toothing, a rotation can be carried out in stepwise fashion in virtually any angular position of connector housing 215 with respect to motor housing part 213.

Beneath annular groove 292 that is provided with toothing 293, adapter 212 has a further annular groove, that is not depicted in detail, for receiving one or more sealing rings.

FIG. 11 depicts one variant in which a grounding clip 295 is attached to metal lower shell 228 and is configured such that by correspondingly designing one plug 249 of plug connector unit 216, a horizontal grounding pin 296 comes into direct contact with grounding clip 295 when plug connector unit 216 is inserted.

Furthermore, FIG. 11 also shows a shielding wall 243, which is either fixedly provided or can be placed in two different positions in lower shell 228. In this context, it is possible to arrange shielding wall 243 either in the position depicted in FIG. 11, i.e., between second plug connector unit 217' and third plug connector unit 217" and/or between third plug connector unit 217" and plug connector unit 216. The measures cited with regard to FIG. 11 can also be undertaken with respect to lower shell 128 in accordance with FIG. 7.

In the exemplary embodiments of plug connector device 11, 111, 211 depicted in the drawing, connector housing 15, 115, 215 is subdivided horizontally into a lower shell 28, 128, 228 and a cover shell 29, 129, 229. According to another undepicted exemplary embodiment of the present invention, the connector housing is subdivided in a vertical longitudinal plane such that the two connector housing parts, configured symmetrically or asymmetrically, can be brought together in the plane of the adapter or of the exterior surface of motor housing part 13, 113, 213. In this context, the plug connector units are preferably accommodated in one of the two connector housing parts, whereas the other connector housing part is empty and, if necessary, receives the area of the plug connector units that extends beyond the separating plane. In this exemplar embodiment, the adapter on its exterior circumferential side is provided with an annular undercut on one annular exterior circumference, into and over which the two connector housing parts can be slipped from the radial sides of the adapter. Both connector housing parts are rotatably but not detachably supported on the adapter.

In a further variant of this exemplary embodiment of the connector housing that is subdivided in a vertical plane, the plug connector units are either arranged, as in the depicted exemplary embodiments, in one horizontal plane next to each other, or they are arranged within one of the two connector housing parts one on top of the other, a horizontal separating wall that functions as an electromagnetic shield being arranged between the two plug connector units that are disposed one on top of the other.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A servo motor system which receives electrical power and control signals through power and signal wires that extend through a wire-passing aperture with a vertical axis formed in a motor housing, including:
    a connector housing which has upper and lower shells, said lower shell including an inner end portion with walls forming a shell opening, said inner end portion being connected to said motor housing with said shell opening aligned with said wire-passing aperture in said motor housing;
    power and control cables that each has individual conductors;
    a pair of outer plugs including an outer power plug with contacts connected to conductors of said power cable, and an outer signal plug with contacts connected to conductors of said signal cable;
    a pair of inner plugs that include an inner power plug with contacts connected to said power wires and an inner signal plug with contacts connected to said signal wires;
    said outer and inner plugs lie in said connector housing, and said connector housing has walls that fix the positions of said plugs with their contacts mated to contacts of a corresponding plug;
    an adaptor on said motor housing, said adaptor having walls forming an adaptor bore that is aligned with said wire aperture;
    said inner end portion of said lower shell has a tubular part that forms said shell opening and that fits into said adaptor bore, said tubular part forming an upwardly-facing shoulder;
    a fastener that detachably engages said adaptor and said upwardly-facing shoulder to detachably hold together said lower shell and adaptor.

2. The system described in claim 1 wherein:
    said adaptor has a pair of radially-inwardly extending projections at one side of said adaptor bore and has a threaded hole at an opposite side of said adaptor bore;
    said shell opening walls form a radially outwardly-extending flange at a lower end thereof; and including
    a screw that extends through said threaded hole and that engages said shell opening walls above said flange.

3. The system described in claim 1 wherein:
    said shell opening walls and said adaptor bore walls are each circular and each has a partially circular groove therein, with walls of the adaptor having three slots at the bottom of its groove;
    a clip of resilient metal which lies in the adaptor groove and which has three radially inward projections that project through said slots into the groove of the shell opening walls.

4. The system described in claim 3 wherein:
    said groove in said shell opening wall has a plurality of recesses, and said clip has a projection that engages one of said recesses at each of a plurality of rotational positions of said shell opening wall about said axis.

5. A plug connector device for a compact servomotor, having a power plug unit, and a control signal plug unit, both supported on a motor housing around an axis of a motor aperture, and each plug unit having pin and socket plugs that can be detachably plugged into each other, wherein:
    the plug units are accommodated in a connector housing, which at its one end is supported on the motor housing and on its other end accepts a power cable and a separate control signal cable that are respectively connected to one of the plugs of a corresponding one of said plug units;
    said connector housing being fixable on the motor housing part in any of a plurality of preset angular positions.

6. The system described in claim 5 wherein:
    said connector housing has a connector wall and said motor housing has a motor wall that surrounds said connector wall, said motor wall having groove and a plurality of slots at the bottom of its groove and said connector wall having tooth-receiving recesses;
    a clip of resilient metal which lies in said groove, the clip having a plurality of radially inward projections that project into said slots, and the clip having a tooth that projects through one of said slots and engages one of said tooth-receiving recesses.

* * * * *